United States Patent [19]

Lerminiaux et al.

[11] Patent Number: 5,835,651
[45] Date of Patent: Nov. 10, 1998

[54] ACHROMATIC DEVICE IN INTEGRATED OPTICS

[75] Inventors: Christian Lerminiaux, Fontainbleau; Denis M. Trouchet, Quincy-Suus-Senart, both of France

[73] Assignee: Corning Incorporated, Corning, N.Y.

[21] Appl. No.: 542,239

[22] Filed: Oct. 12, 1995

[30] Foreign Application Priority Data

Oct. 13, 1994 [FR] France ................................ 92 12247

[51] Int. Cl.$^6$ .............................. G02B 6/26; G02B 6/42
[52] U.S. Cl. ................................. 385/50; 385/14
[58] Field of Search ................... 385/14, 50, 24, 385/40, 136, 129, 27, 48, 130, 16, 18

[56] References Cited

U.S. PATENT DOCUMENTS

| | | | |
|---|---|---|---|
| 4,355,864 | 10/1982 | Soref | 385/16 |
| 4,740,951 | 4/1988 | Lizet et al. | 385/14 |
| 4,856,859 | 8/1989 | Imoto | 385/50 |
| 4,979,788 | 12/1990 | Brazas | 385/14 |
| 5,044,718 | 9/1991 | Kando | 385/4 |
| 5,082,341 | 1/1992 | Walker | 385/14 |
| 5,101,458 | 3/1992 | Spaulding et al. | 385/36 |
| 5,139,556 | 8/1992 | Caldera | 65/29 |
| 5,297,233 | 3/1994 | Lerminiauz | 385/27 |
| 5,420,947 | 5/1995 | Li et al. | 385/37 |
| 5,428,635 | 6/1995 | Zhiglinsky et al. | 372/92 |
| 5,526,439 | 6/1996 | Bergmann | 385/24 |

FOREIGN PATENT DOCUMENTS 0 472 382 A1 8/1991 European Pat. Off. .
0 527 425 A1 8/1992 European Pat. Off. .

OTHER PUBLICATIONS

Journal of Lightwave Technology, vol. 11, No. 12, Dec. 1993, NY US, pp. 2044–2051.
IEEE Photonics Technology Letters, Vo. 3, No. 4, Apr. 1991, NY US, pp. 339–341.

Primary Examiner—Akm E. Ullah
Attorney, Agent, or Firm—William Chervenak

[57] ABSTRACT

The device consists of a dual-mode waveguide 1 that has a longitudinal axis [X], a length [L], and a width [W], and two pairs of monomode waveguides 2, 3 and 4, 5, for entry and exit, respectively. In accordance with the invention, the length [L] and the width [W] of the dual-mode waveguide [1] are selected in such a way as to establish, in this guide, light coupling that is greater in the window from 1260 to 1360 nm than in the window from 1480 to 1580 nm, so as to compensate for the significant contrary proximity coupling in these windows, as created between the monomode entry guides 2 and 3 on the one hand and the monomode exit guides 4 and 5 on the other hand.

9 Claims, 3 Drawing Sheets

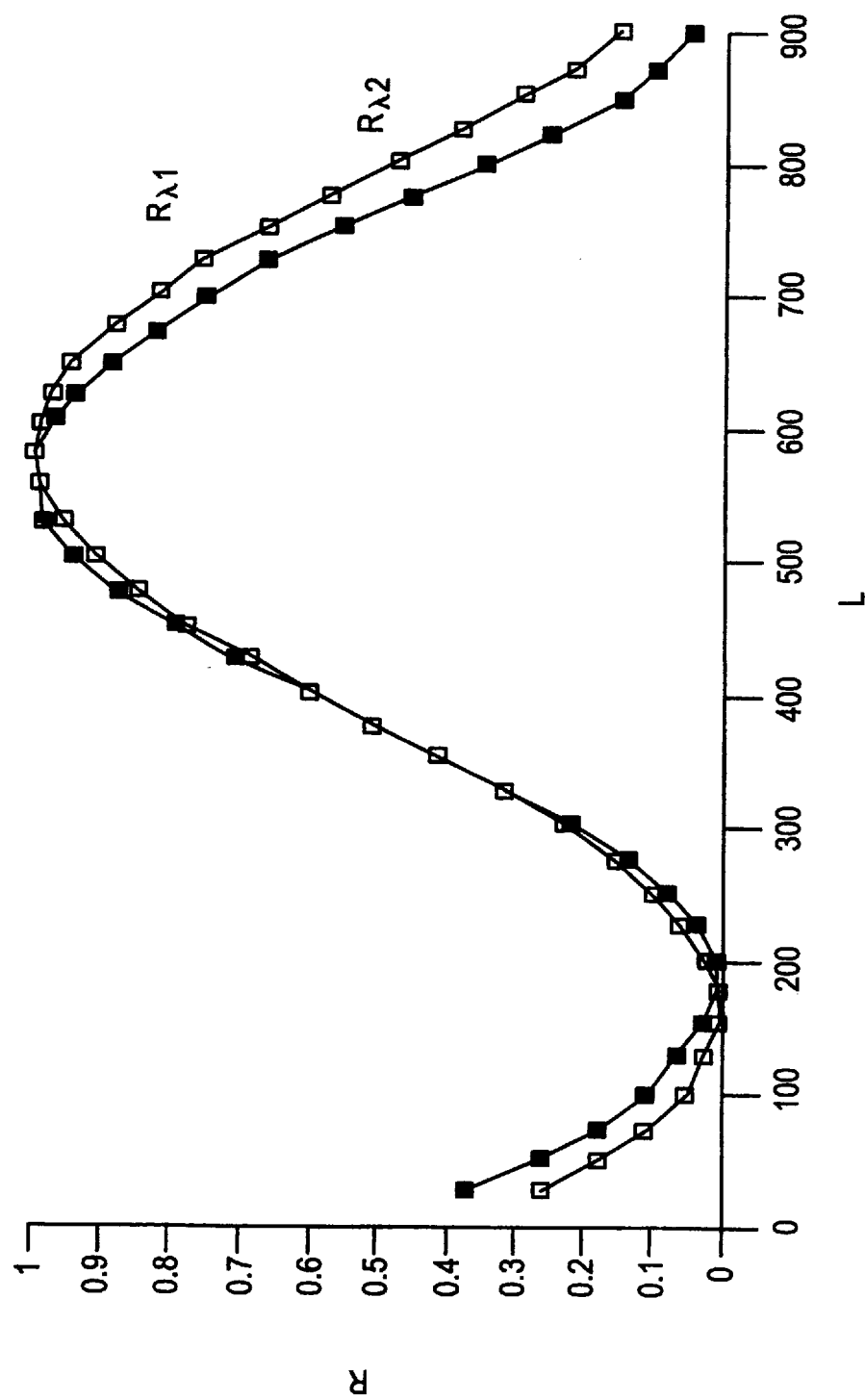

ACHROMATIC DEVICE IN INTEGRATED OPTICS

The present invention relates to an achromatic device in integrated optics and, more specifically, to such a device that has low insertion losses in the spectral windows from 1260 to 1360 nm and from 1480 to 1580 nm, and that includes:

a) A dual-mode integrated waveguide that is located near the surface of a substrate and that has a longitudinal axis, a length, and a width that are parallel to the surface of the substrate, and b) Two pairs of monomode waveguides, for entry and exit, respectively, each of which is connected to one of the ends of the dual-mode guide, with the guides in each pair diverging symmetrically and gradually from the longitudinal axis starting at the dual-mode guide.

Devices are currently known, which are currently referred to as "2 to 2 couplers" or "2×2 couplers", particularly through French patent application No. 2 680 418, as filed under the name of the present applicant The device described in that application was designed to be used particularly in monomode fiber-optic telecommunications, in the two standardized spectral windows mentioned above. The goal of the device in question is to ensure the division of the light intensity received from an entry waveguide between two exit waveguides, with a pre-determined division ratio, while remaining essentially achromatic in these two spectral windows. To do so, the device in question includes an X junction of the two waveguides, to which the entry and exit waveguides are connected. The waveguides in the junction are implemented through the diffusion of ions in a glass substrate. Through a suitable selection of the angle defined by the axes of the waveguides in the X junction, a pre-determined division ratio can be implemented. However, with regard to the preferred embodiments, it has been indicated that a noticeable chromaticity reappears when the selected half-angle is less than approximately 0.7 degree, and particularly when the waveguides are fabricated through ion diffusion.

Furthermore, there is currently a need for a 2×2 coupler in integrated optics that has low insertion losses, i.e., low losses of light energy on each of the four possible optical pathways between the two entries and the two exits, such that for example these losses should be a maximum of 4 dB on each of the said optical pathways.

In order to achieve this goal, it is known that it is essential to reduce excess losses in other words, the light energy that is not transmitted at the exits of the 2×2 coupler and that is dissipated in the substrate. Excess losses can be reduced through a reduction of the half-angle of the guides in the X junction of the device described in the above-mentioned patent, for example, by selecting a half-angle of less than 0.7 degree. However, as noted above, the resulting device is affected by a chromaticity error, which is unacceptable in fiber-optic telecommunications in the two above-mentioned spectral windows.

Therefore, the goal of the present invention is to provide a 2×2 coupler device in integrated optics that displays a satisfactory amount of achromaticity, so as to create low insertion losses in the above-mentioned spectral windows.

This goal of the invention, along with others that will become apparent through a reading of the following description, is achieved with an achromatic device in integrated optics that has low insertion losses in the spectral windows from 1260 to 1360 nm and from 1480 to 1580 nm, and that includes: a) a dual-mode waveguide 1 that is integrated near the surface of a substrate and that has a longitudinal axis [X], a length [L], and a width [W] that are parallel to the surface of the substrate; and b) two pairs of monomode waveguides, for entry and exit, respectively, each of which is connected to one of the ends of the dual-mode guide, with the guides in each pair diverging symmetrically and gradually from the axis [X] from the dual-mode guide; with this device being remarkable in that the length [L] and the with [W] of the dual-mode guide are selected in such a way as to establish in this guide light-coupling that is greater in the window from 1260 to 1360 nm than in the window from 1480 to 1580 nm, so as to compensate for the significant contrary proximity coupling in these windows, as created between the monomode entry guides on the one hand and the monomode exit guides on the other hand.

By arranging for the compensation of the light couplings observed in the various parts of the device, the achromaticity of the device in the two spectral windows in question can be ensured, as we shall see later on.

In accordance with another characteristic of the preferred embodiments of the device in accordance with the present invention, the axis of each monomode guide is inclined in relation to the axis [X] by an angle that is less than approximately 0.7 degree, at the point where the guide is connected to one end of the dual-mode guide. Because of this low connection angle, the excess losses and therefore the insertion losses are minimized. Generally speaking, it is advisable to try to select a connection angle that is as small as possible, in order to limit the losses; however, if this angle is too small, one runs the risk of introducing couplings between the monomode guides.

Other characteristics and advantages of the device in accordance with the invention will become clear from a reading of the following description and an examination of the attached drawing, on which:

FIG. 3 shows curves for insertion losses for the device shown in FIG. 1, in a frequency domain that covers the two above-mentioned spectral windows.

Figure 1:
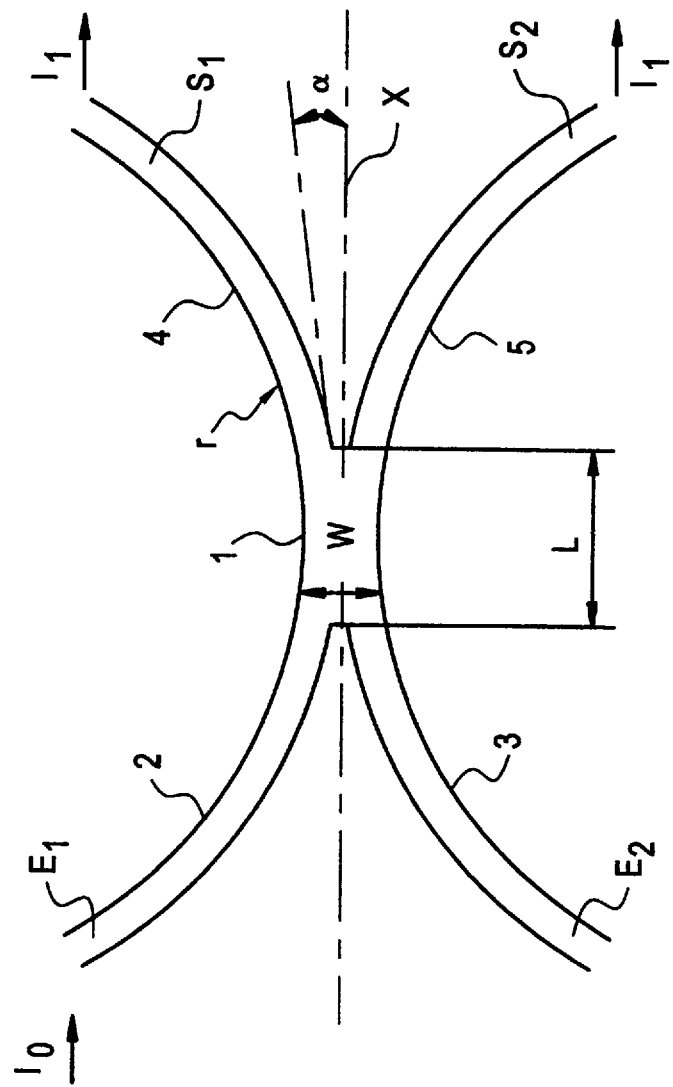
FIG. 1 is a plan view of the configuration of the waveguides in the device in accordance with the invention.

The device in accordance with the invention is obtained through the implantation of the waveguide configuration shown in FIG. 1 on a substrate that is made, for example, of glass. The implantation can be ensured by means of the masking and diffusion of ions, such as thallium ions, as is well known in integrated optics technology.

The configuration shown in FIG. 1 includes a dual-mode waveguide 1 that has a longitudinal axis [X], a length [L], and a width [W] that are parallel to the surface of the substrate; and that is sized so as to allow the progression of light waves in accordance with a basic symmetrical mode, and a second, asymmetrical mode, and two pairs of monomode waveguides 2, 3 and 4, 5, respectively, each of which is connected to one of the ends of the dual-mode guide. The guides in each pair diverge symmetrically and gradually from the axis [X], starting at the dual-mode guide. The guides in each pair have identical widths and are suitable for the monomode propagation of light.

$$R = \frac{I_2}{I_1 + I_2}$$

By convention, the guides 2 and 3 are referred to as "entry" guides and the guides 4 and 5 are referred to as "exit" guides. Thus, light energy that has an intensity $I_0$ and that enters the device through the entry $E_2$ of the guide 2 is distributed, except for losses, between the exit guides 4 and 5, at the exits $S_1$ and $S_2$, for which the light intensities $I_1$ and $I_2$ are measured, with the device thus ensuring a division of the light power at the exit of the device in the ratio R, such that:where $I_2$ is the intensity of the light energy coming out of the exit guide 5 opposite the entry guide 2 through which the light energy with the intensity $I_0$ entered.

In accordance with the teachings of the above-mentioned patent, this ratio can be set to a predetermined value if a suitable selection is made for the half-angle of the guides in an X junction, within an angular range that is preferably limited to less than approximately 0.7 degree, in order to limit the chromaticity of the junction.

In accordance with the present invention, a 2×2 coupler device is implemented that makes it possible to establish a pre-determined division ratio R while reducing the insertion losses to below a given level and also preserving a satisfactory level of achromaticity.

As explained above, in order to reduce the insertion losses by reducing the excess losses, it is necessary to reduce the angle of the axes of the entry and exit waveguides. In this regard, in accordance with the preferred embodiments of the invention, the axis of each monomode guide is inclined in relation to the axis [X] by an angle [α] that is less than approximately 0.7 degree, at the point where the guide is connected to one end of the dual-mode guide.

Then it is necessary to reduce the chromaticity that results from this selection. This reduction in achieved, in accordance with an important characteristic of the present invention, by selecting the length [L] and the width [W] of the dual-mode guide in such a way as to establish in this guide a light coupling that is larger in the window from 1260 to 1360 nm than in the window from 1480 to 1580 nm, such that the various light couplings that are formed in the successive portions of the device in accordance with the invention mutually compensate for each other, as will now be explained with reference to FIG. 2.

In the dual-mode guide 1 of this device, the light coupling from an entry guide in the two exit guides is caused by interference between the fundamental mode, which is symmetrical, and the second mode, which is asymmetrical. It can be shown that the light intensity transmitted to each exit guide is a sinusoidal function of the cumulative phase shifting or displacement between these two propagation modes, which leads to the following mathematical expression for the division ratio R:

$$R = \sin^2\left[\frac{\Delta\phi}{2}\right]$$

with:

$$\Delta\phi = 2\pi \frac{\Delta n(\lambda, W) \cdot L}{\lambda}$$

where:

ΔΦ is the phase shift or displacement applied between the two dual-mode guides 1;

λ is the wavelength of the light;

L and W are the length and the width of the dual-mode waveguide, respectively; and Δn (λ, W) is the phase-index difference between the two modes that is propagated in the dual-mode guide.

It is clear from this relationship that the phase shift or displacement ΔΦ is on the first order inversely proportional to the wavelength of the light, and thus takes on a larger value at 1310 nm than at 1550 nm. As a result, the light coupling, which is a sinusoidal function of ΔΦ, is also greater at 1310 nm than at 1550 nm if the direction of the change in the sinusoidal function is increasing.

Among the approach sections of the monomode entry guides on the one hand, and the exit guides on the other hand, the light coupling is of the same nature as in a proximity coupler. Therefore, it is greater at 1550 nm than at 1310 nm, because the width of the mode at 1550 nm is greater than the width observed at 1310 nm, as is well known, and because the mode then interacts more strongly with the adjacent waveguide. It can be seen that this coupling evolves, as a function of the wavelength, in a direction opposite to the one introduced by the propagation in the dual-mode waveguide.

In accordance with the invention, these contrary variations in light coupling are turned to advantage, so that they compensate for one another, in order thereby to improve the achromaticity of the device in accordance with the invention.

Taking into consideration the light coupling in the two approach sections 2, 3 and 4, 5, and in the dual-mode waveguide 1, the division ratio R can be written in the following way:

$$R = \sin^2\left[\pi \frac{\Delta n(\lambda, W) \cdot (L + L_0(\lambda))}{\lambda}\right]$$

where $L_0$ represents a length equivalent to the coupling of the two entry guides 2 and 3 on the one hand, and of the two exit guides 4 and 5 on the other hand.

It should be noted that the equivalent coupling length $L_0$ (λ) is a function of the wavelength, and that the difference in the phase index is a function of both this wavelength and the width W of the dual-mode waveguide.

Figure 2:
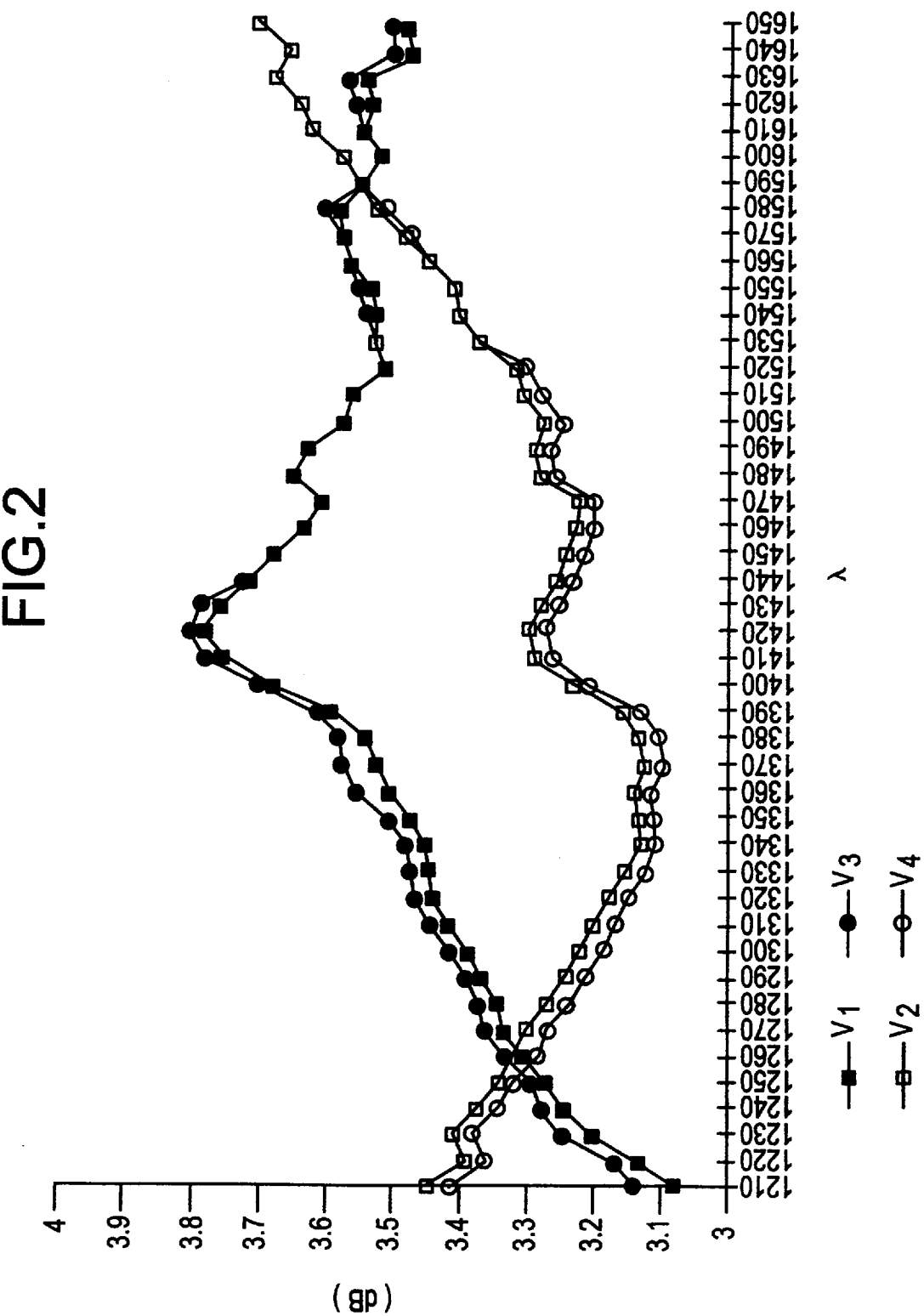
FIG. 2 shows curves that are useful in the explanation of the sizing of the dual-mode guide in the device in accordance with the invention.

FIG. 2 shows the curves for the variations in the two division ratios $R_{11}$ and $R_{12}$, at two wavelengths $\lambda_1$=1310 nm and $\lambda_2$=1550 nm, respectively, each of which is located in one of the above-mentioned spectral windows, as a function of the length L assigned to the dual-mode guide 1.

In accordance with the explanation given earlier, the division ratios represented in FIG. 2 vary sinusoidally as a function of the effective length L of the dual-mode guide. When L=0, the light coupling is caused only by the proximity coupling between the monomode entry and exit guides. The length $L_0$ (λ), which is equivalent to this coupling, plays a role only in the division ratio. Because this proximity coupling is greater at $\lambda_2$=1550 nm than it is at $\lambda_1$=1310 nm, the length $L_0$ ($\lambda_2$), which represents this coupling, will also be greater than the length $L_0$ (λ1), and therefore (because the curves for the sinusoidal functions have a negative slope in the region when L=0) the division ratio $R_{12}$ will be smaller and therefore "in front of" the division ratio $R_{11}$.

Generally speaking, the oscillation period of the division ratio $R_1$ is equal to λ/Δn (λ, W). Because on the first order this period depends on the wavelength λ, it can be observed that the oscillation period of the ratio $R_{11}$ is shorter than that of the ratio $R_{12}$. This result again expresses the fact that the light coupling is greater at 1310 nm than at 1550 nm during propagation in the dual-mode waveguide 1. Because the division ratio $R_{12}$ is slightly "in front", it will be intersected by the ratio $R_{11}$, which has a shorter oscillation period.

In accordance with the invention, the coupling compensation is made exact through an adjustment of the width [W] of the dual-mode guide, which, through a second-order dependence, makes it possible to affect the difference in the phase index Δn (λ, W) that plays a role in the expression given above for the division ratio R.

In practice, in order to create a 2×2 coupler in accordance with the invention that ensures a division ratio, for example, of 0.5, the width [W] and the length [L] of the dual-mode guide should be selected in such a way that the curves shown in FIG. 2 intersect at the 0.5 ordinate, with adjacent slopes. At this functional point the coupling ratios in the two windows are essentially equal, thereby ensuring that the desired achromaticity will be obtained. Of course, similar operations would be carried out in order to set the division ratio to a value other than 0.5.

FIG. 3 shows the curves $V_1$ through $V_4$ for the variations in insertion losses as measured on the various optical pathways in the device in accordance with the invention, i.e., from $E_1$ to $S_1$, from $E_1$ to $S_2$, from $E_2$ to $S_1$, and from $E_2$ to $S_2$, respectively, in a spectral range that covers the two windows used in monomode fiber-optic telecommunications.

So that the choices mentioned above can be implemented, sets of couplers have been fabricated in which the following changes have been made:

The angle α has been varied from 0.4 degree to 0.8 degree, by steps of 0.2 degree;

The width of the dual-mode guide has been varied from 7 to 10 μm, by steps of 1 μm;

The length [L] has been varied from 0 to 900 μm by steps of 25 μm; and curves that correspond to the ones in FIG. 2 and FIG. 3 have been prepared for each coupler. The information obtained in this way makes it possible to select the characteristic parameters of a coupler as a function of the specifications established for the insertion losses (which losses should be as low as possible). From this point of view, the couplers for which the angle α=0.8 degree were found to be unsatisfactory.

For a coupler in accordance with the invention for which the connection angle α is 0.4 degree, the radius of curvature r of the monomode guides is 100 mm, the width [V] of the dual-mode guide (as measured on the mask used to fabricate the guide) is 7 μm, in the case of a coupler fabricated through the use of ion-exchange techniques, the width of the monomode guides is 3 μm, and the length of the dual-mode guide is 375 μm, it appears that the maximum insertion loss observed, in the spectral windows in question, for the set of four optical pathways, is 3.675 dB at 1480 nm. Therefore, the invention does indeed make it possible to achieve the stated goal, i.e., to implement a 2×2 coupler that has insertion losses of less than 4 dB and that displays a good level of achromaticity in the said spectral windows, with the chromaticity error observed for the curves in FIG. 3 not exceeding 0.5 dB.

Generally speaking, the characteristics of a coupler in accordance with the invention will preferably be selected within the following limits:

0.1 degree<α_<0.7 degree, and preferably 0.2 degree<α_<0.7 degree

100 μm<L<1000 μm, and preferably 100 μm<L<1000 μm

4 μm<W<9 μm, and preferably 6 μm<W<9 μm

20 μm<r<200 μm, and preferably 50 μm<r<200 μm in order to obtain insertion losses less than 3.8 dB.

By convention, the angle α is measured at a point in a monomode guide located 1 μm from the adjacent end of the dual-mode guide.

With regard to the width [W], the lower and upper terminals mentioned depend on the integrated optical technology utilized, and correspond respectively to the transitions between monomode propagation and dual-mode propagation, and between dual-mode propagation and triple-mode propagation, respectively, in the waveguide 1.

Of course, the invention is not limited to the embodiment described and represented, which has been offered only as an example. Thus, the invention also extends to 2×n couplers that include a 2×2 coupler connected by at least one of its exits to division means with integrated waveguides that are suitable for distributing the incoming light power among n exit ports, where n is an integer greater than 2, as described in the above-mentioned patent application. The invention also extends to couplers in which the monomode guides do not have identical widths, even though the invention makes it possible to obtain the desired achromaticity without requiring recourse to monomode guides with different widths.

We claim:

1. Achromatic device in integrated optics that has low insertion losses in the spectral windows from 1260 to 1360 nm and from 1480 to 1580 nm and that includes:

a) a dual-mode waveguide 1 that is integrated near the surface of a substrate and that has a longitudinal axis [X], a length [L], and a width [W] that are parallel to the surface of the substrate; and b) Two pairs of monomode waveguides 2, 3 and 4, 5, for entry and exit, respectively, each of which is connected to one of the ends of the dual-mode guide 1, with the guides in each pair diverging symmetrically and gradually from the axis [X] starting at the dual-mode guide 1; characterized by the fact that the length [L] and the with [W] of the dual-mode guide 1 are selected in such a way as to establish in this guide light-coupling that is greater in the window from 1260 to 1360 nm than in the window from 1480 to 1580 nm, so as to compensate for the significant contrary proximity coupling in these windows, as created between the monomode entry guides 2 and 3 on the one hand and the monomode exit guides 4 and 5 on the other hand.

2. Device in accordance with claim 1, characterized by the fact that the axis of each monomode guide is inclined in relation to the axis [X] by an angle [α] that is less than approximately 0.7 degree, at the point where the guide is connected to one end of the dual-mode guide 1.

3. Device in accordance with either claim 1 or claim 2, characterized by the fact that the length [L] of the dual-mode guide is between 100 μm and 750 μm.

4. Device in accordance with any one of claims 1 to 3, characterized by the fact that the width [W] of the dual-mode guide is between 4 μm and 9 μm, and preferably between 6 μm and 9 μm.

5. Device in accordance with any one of the preceding claims, characterized by the fact that the maximum insertion loss in the two spectral windows is less than 3.8 dB.

6. Device in accordance with any one of the preceding claims, characterized by the fact that the maximum chromaticity error is less than 0.5 dB.

7. Device in accordance with any one of the preceding claims, characterized by the fact that the monomode entry and exit guides have a radius of curvature that is between 20 μm and 200 μm, and preferably between 50 μm and 200 μm.

8. Device in accordance with any one of the preceding claims, characterized by the fact that the light power at the exit of the device is divided in the ratio R=0.5.

9. Achromatic coupler, in integrated optics, of the 2×n type, characterized by the fact that it includes a device in accordance with any one of claims 1 through 9, and additional division means that are connected between at least one of the outputs of the device and n outputs of the coupler.

* * * * *